Mar. 27, 1923.

J. E. DACEY 1,449,811

SANITARY COVER FOR MILK CANS

Filed Feb. 1, 1922

WITNESSES
W. A. Williams

INVENTOR
J. E. Dacey
BY
Munn & Co.
ATTORNEYS

Patented Mar. 27, 1923.

1,449,811

UNITED STATES PATENT OFFICE.

JAMES EDWARD DACEY, OF DUBOIS, PENNSYLVANIA.

SANITARY COVER FOR MILK CANS.

Application filed February 1, 1922. Serial No. 533,369.

*To all whom it may concern:*

Be it known that I, JAMES E. DACEY, a citizen of the United States, and a resident of Dubois, in the county of Clearfield and State of Pennsylvania, have invented certain new and useful Improvements in Sanitary Covers for Milk Cans, of which the following is a specification.

This invention relates to sanitary covers for milk cans or the like, and has for its object to provide a cover of this character which may be conveniently constructed of a single piece of sheet metal, such as aluminum or the like and which may be readily associated with a milk can and which when so associated may be conveniently manipulated so as to occupy either closed or open position, the cover in the open position permitting a supply of milk to be taken from the can and in the closed position preventing any flow of milk from the can and also preventing dust, flies or foreign matter from finding its way into the milk.

Another object is to provide a cover of this character which is adaptable for use with cans which vary slightly in size and which may be readily and easily put in place on the can or taken therefrom, the cover, however, when put on the can being firmly maintained in proper position thereon and permitting of tilting of the can without danger of the cover falling therefrom.

Another object is to provide a cover of this character which may be cheaply and conveniently manufactured, which is of simple and durable construction, reliable and efficient in operation.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 3:
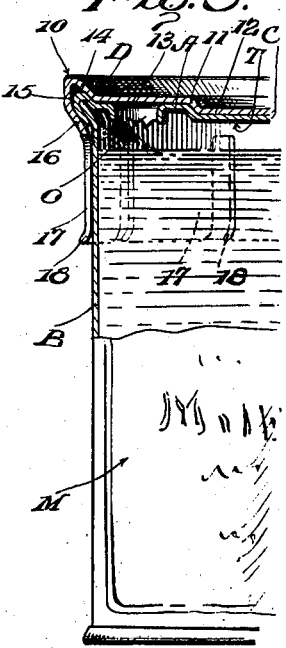
Figure 3 is a fragmentary view, partly in section and partly in elevation, showing the can in normal upright position and the cover in closed position.

Referring to the drawings, the reference character M designates a milk can of conventional construction, such for instance as is used in packaging or canning evaporated milk. As usual the milk can includes a cylindrical body B and a top T, the top T having a depressed central portion C and an annular marginal portion A united to the body of the can by a crimp or bead D in such manner as to present a shoulder, as clearly shown in Figure 3. The annular portion of the top of the can is punched in the usual manner to provide the milk discharge outlet or opening O and an air vent V.

The cover which constitutes the present invention is designated generally at 10 and preferably this cover is stamped from a single piece of resilient sheet metal such as aluminum or the like. The cover 10 includes a plate 11 of general circular form and having a central depressed portion 12 and an annular marginal portion 13, the depressed portion 12 snugly engaging and bearing upon the depressed portion C of the top of the can and the marginal portion 13 bearing upon the marginal portion A of the top of the can when the cover is associated with the can. An upwardly and outwardly inclined annular flange 14 is integrally formed with the annular portion 13 of the circular plate, and this upwardly inclined portion 14 has integrally formed with itself a depending peripheral flange 15, the angular relation of the flanges 14 and 15 defining a recess or cavity which receives the corner or shoulder presented by the crimp D of the can and the under surface of this shoulder of the can being engaged by a gripping shoulder 16 of circular form which is integrally formed with the depending flange 15. The gripping shoulder 16 resiliently grips the under surface of the corner or shoulder of the can, and this resilient gripping action of the shoulder 16 brings into play not only the resiliency of the metal which goes to make up the shoulder 16 itself but also the resiliency of the metal which forms the flanges 14 and 15. Combined guiding and gripping fingers 17 extend downwardly from the gripping shoulder 16 and are arranged to exert a gripping action against the periphery of the body B of the can as well as to guide the gripping shoulder 16 into gripping position on the shoulder presented by the crimp D of the can. The extremities of the finger 17 are flared outwardly, as at 18, to facilitate the placing of the cover on the can. The fingers 17 as well as the shoulder 16 possess a high degree of resiliency and a capacity for substantial flexion and these properties enable the cover to adjust itself to cans of slightly varying sizes. The fingers 17 are arranged in circular series around the cover, and consequently around the can so that the resilient gripping effect of these fingers is very substantial, and this gripping effect supplements the gripping action of the shoulder 16 so that the cover is firmly maintained in adjusted position on the can.

Figure 1:
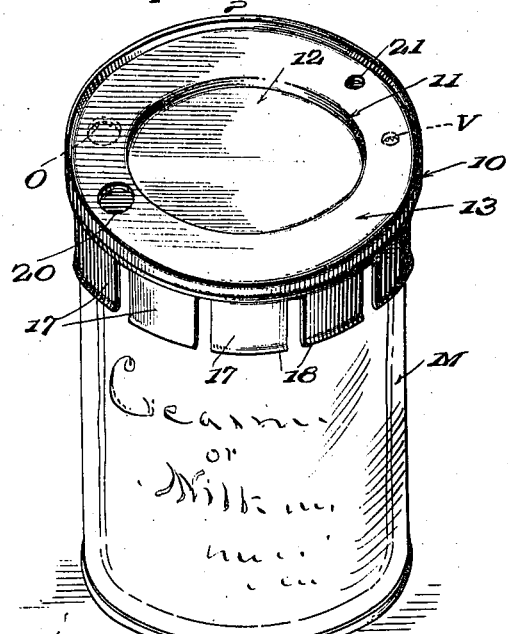
Figure 1 is a perspective view, illustrating the milk can equipped with a cover embodying the present invention.
Figure 2:
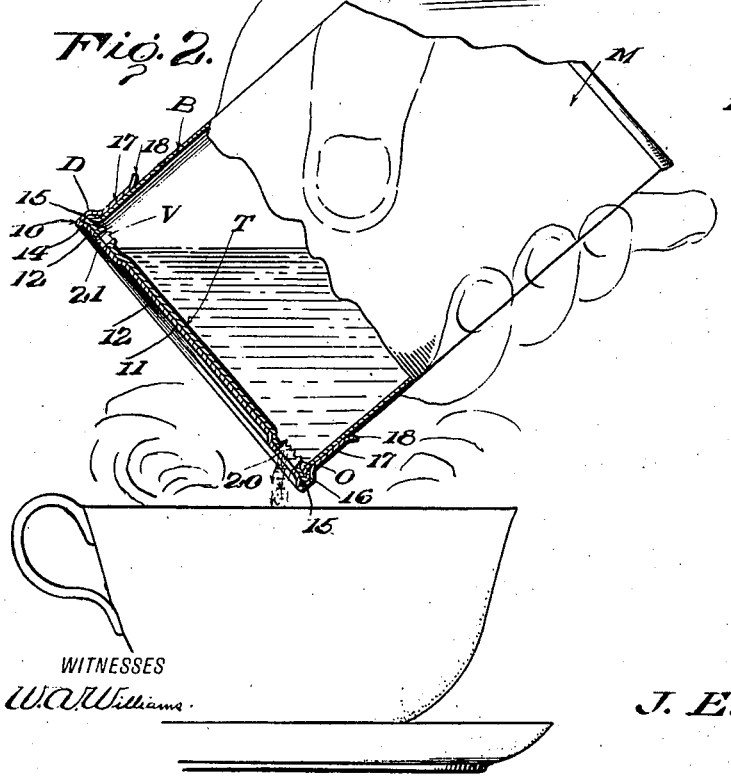
Figure 2 is a view, partly in elevation and partly in section, illustrating a can equipped with a cover embodying the invention and showing the can and cover positioned to permit of the flow of milk from the can.

The annular marginal portion 13 of the circular plate 11 has formed therein a milk outlet or opening 20 and an air vent or opening 21 adapted to be brought into registration with the milk outlet O and vent V respectively of the top of the can. The openings 20 and 21 may be brought into registration with the openings O or V respectively or moved out of registration therewith by gripping the cover 10 with the hand and turning it relative to the can and such movement of the cover does not tend to dislodge it from its position on the can as the gripping shoulder 16 precludes such a possibility. In this way the cover may be readily manipulated to permit flow of the milk from the can when this is desired as shown in Figure 2 or the cover may be moved so as to close the openings in the can and prevent ingress of dust, flies or other foreign bodies as indicated in Figure 1. When it is desired to remove the cover from a can it is only necessary to exert a direct pull thereon and this will be effective to withdraw the cover from its position on the can. On the other hand the cover may be readily associated with the can by pushing the same thereon, the fingers 17 and shoulders 16 springing away to accommodate this motion and snapping back into position when the cover is properly on the can. It is to be noted that when the cover is on the can the primary and major function of the gripping shoulder 16 is to maintain the cover on the can and to prevent the accidental displacement of the cover from the can. On the other hand, the primary and major function of the fingers 17 is to maintain the cover in any position in which it may be adjusted angularly with respect to the can so as to maintain the discharge outlet of the cover in registration with the discharge outlet of the can or out of registration therewith, as desired. Aside from these major functions the gripping shoulder and fingers assist each other in performing their respective functions.

I claim:

1. A sanitary cover constructed of a single piece of metal and adapted for use with a milk can having a milk discharge opening and an air vent in its top comprising a circular plate adapted to snugly engage the top and provided with a milk discharge opening and an air vent opening adapted to be brought into registration with the milk discharge opening and air vent respectively of the can top or to be moved out of registration therewith, said covering having a resilient gripping shoulder integrally formed therewith adapted to resiliently engage the can and also having combined guiding and gripping fingers integrally formed with the shoulder and engageable with the can, the fingers having their extremities flared to facilitate the placing of the cover on the can.

2. A sanitary cover constructed of a single piece of metal and adapted for use with a milk can having a milk discharge opening and an air vent in its top comprising a circular plate adapted to snugly engage the top and provided with a milk discharge opening and an air vent opening adapted to be brought into registration with the milk discharge opening and air vent respectively of the can top or to be moved out of registration therewith, said covering having a resilient gripping shoulder integrally formed therewith adapted to resiliently engage the can and also having combined guiding and gripping fingers integrally formed with the shoulders and engageable with the can.

3. A sanitary cover constructed of a single piece of metal and adapted for use with a milk can comprising a circular plate adapted to snugly engage the top, said covering having a resilient gripping shoulder integrally formed therewith adapted to resiliently engage the can and also having combined guiding and gripping fingers integrally formed with the shoulders and engageable with the can.

4. A sanitary cover for use with milk cans or the like comprising a plate, a gripping shoulder and combined guiding and gripping fingers.

5. A sanitary cover constructed of a single piece of resilient metal adapted for use with milk cans and comprising a plate adapted to snugly engage the top of the can and a resilient gripping shoulder integrally formed with the plate and engageable with the can for releasably maintaining the cover in position on the can, and combined guiding and gripping fingers integrally formed with the resilient gripping shoulder and engageable with the can to supplement the action of said gripping shoulder.

JAMES EDWARD DACEY.